United States Patent [19]
Stein

[11] 4,425,937
[45] Jan. 17, 1984

[54] FLUID INJECTION SYSTEM

[76] Inventor: Myron Stein, 79 Robert Pitt Dr., Monsey, N.Y. 10952

[21] Appl. No.: 269,677

[22] Filed: Jun. 2, 1981

[51] Int. Cl.³ .............................................. F02B 77/04
[52] U.S. Cl. ................................ 137/480; 123/198 A; 137/504; 137/517
[58] Field of Search .................. 123/25 L, 198 A, 574, 123/582, 587; 137/480, 504, 517, 526

[56] References Cited

U.S. PATENT DOCUMENTS

| | | | |
|---|---|---|---|
| 1,119,042 | 12/1914 | Ricketts | 123/25 L |
| 3,106,226 | 10/1963 | Machen | 137/517 X |
| 3,646,925 | 3/1972 | Eshelman | 137/480 X |
| 3,749,376 | 7/1973 | Alm | 123/198 A X |
| 3,799,132 | 3/1974 | MacGuire | 137/480 X |
| 3,809,035 | 5/1974 | Winton | 123/574 X |
| 3,923,024 | 12/1975 | Dabrio | 137/517 X |
| 3,977,430 | 8/1976 | Bushee | 137/517 X |
| 4,286,550 | 9/1981 | Lewis | 123/198 A X |
| 4,344,406 | 8/1982 | Minor | 123/587 |

FOREIGN PATENT DOCUMENTS

| | | | |
|---|---|---|---|
| 913652 | 9/1946 | France | 137/517 |
| 6856 | of 1914 | United Kingdom | 137/480 |
| 762531 | 11/1956 | United Kingdom | 137/480 |

*Primary Examiner*—Robert G. Nilson
*Attorney, Agent, or Firm*—Herman J. Hohauser

[57] ABSTRACT

An antidetonant injection system for use in an internal combustion engine system having a novel valve in which the amount of antidetonant allowed to flow through the valve is directly related to the amount of engine demand ranging from zero flow when the engine is idling to maximum flow when the engine is at full throttle or under maximum load.

6 Claims, 5 Drawing Figures

U.S. Patent     Jan. 17, 1984     4,425,937
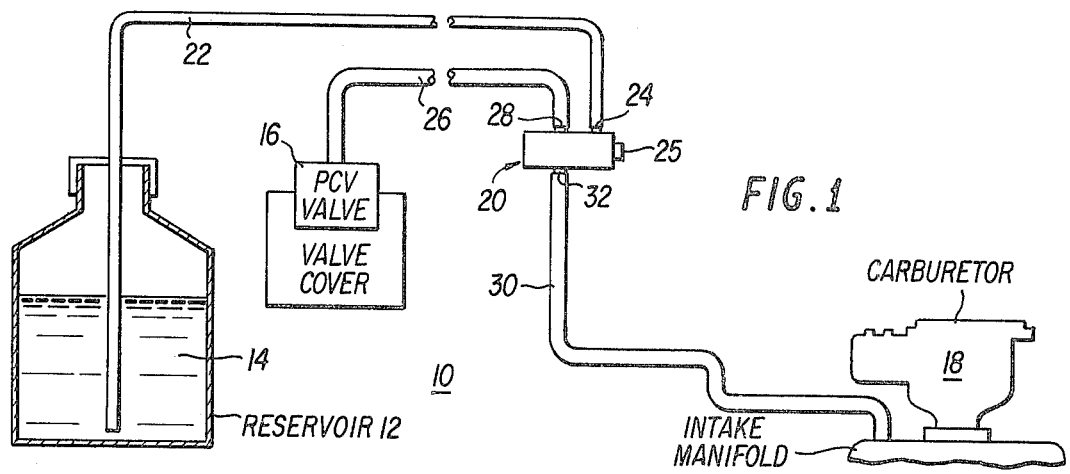
FIG.1
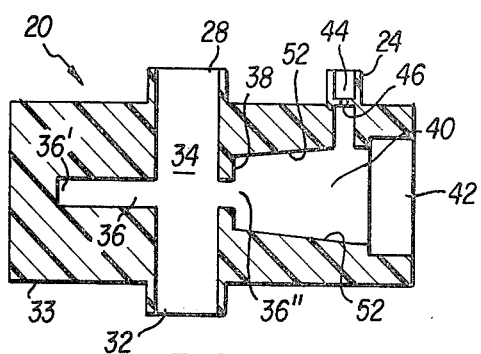
FIG.2A
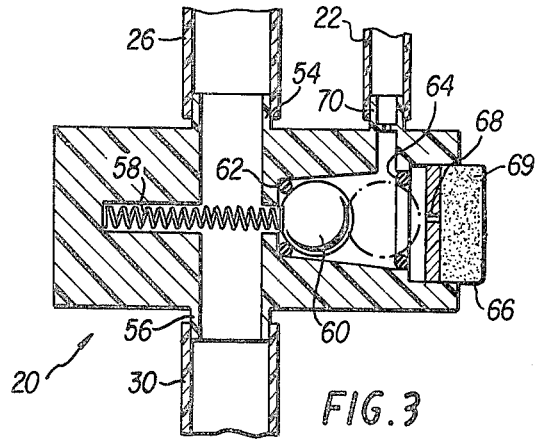
FIG.3
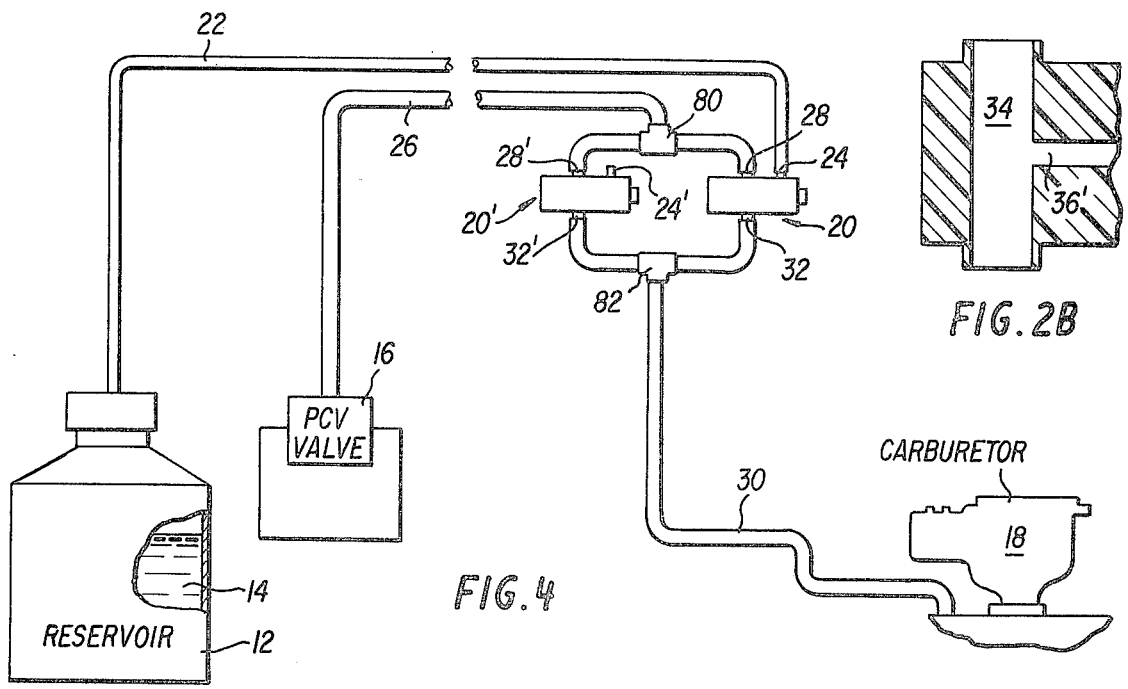
FIG.2B
FIG.4

FLUID INJECTION SYSTEM

BACKGROUND OF THE INVENTION

The present invention relates generally to fluid injection systems and more specifically to a fluid injection system having a novel valve and used in conjunction with an antidetonant fluid for improving the combustion process of an internal combustion engine system.

It is well known that the function of the carburetor in an internal combustion engine system is to produce the hydrocarbon fuel and air mixture needed for operation of the engine. In the carburetor the fuel is distributed in the form of tiny droplets in the stream of air. As a result of heat absorption on the way to the cylinder, these droplets are vaporized so that the fuel/air mixture enters the combustion chamber of the cylinder in the form of a flammable gas.

The burning of the vaporized fuel/air mixture during the process of combustion in internal combustion engine systems produces both nonpolluting by-products of carbon dioxide and water and pollutants including unburned hydrocarbons, carbon monoxide and nitrous oxide. Some of these pollutants form deposits on the intake valve, inside of the combustion chamber and spark plugs and result in less efficient use of fuel, rough idle, hesitation, hard starting, misfires, and backfires. Continued formation of these deposits increase the effective compression ratio of an engine so that higher octane fuel is needed to attain desired combustion and thus sufficient power. It has been determined that removing carbon deposits from the valves and combustion chambers of "dirty" engines lowers the octane requirements of a given engine by an amount estimated to be over ten percent. It has also been found that cooling the intake charge increases the power and miles per gallon and lessens the engine knock for fuel of a given octane rating.

The above findings have led to the development of injection systems that administer an additive to the fuel or antidetonant to cleanse the engine's combustion chamber of carbon buildup and cool the temperature of the intake charge. Known systems inject water, methanol, ethanol, other alcohols and combinations thereof with varied results. The use of some alcohol mixtures have had negative results, namely the formation of pollutants due to inadequate oxygen during the combustion process. Water additives have been found to cool the intake charge to the extent of causing the reduction of the power output and sometimes resulting in too much cooling with increased unburned carbon by-products.

Up to the present time the injection systems used to introduce the antidetonant have been inefficient. Most injection systems are of a constant flow design so that there is no control of the antidetonant resulting in too much additive being introduced when the engine is idling and not enough when the engine is at its peak demand (as during rapid acceleration). Sophisticated electronic control systems have been developed that control the flow of additives, but they are very expensive and require highly qualified technicians for service and installation and, further, make no provision for the extra oxygen required to burn the additive. Up to the present, no service-free low cost injection system has been developed to provide control of additive injection based on engine demand.

An example of prior art attempts is exemplified by water feed injection system disclosed in U.S. Pat. No. 1,119,042 issued to James R. Ricketts on Dec. 1, 1914. In the Ricketts' patent, moisture is introduced into the manifold at a point between the carburetor and internal combustion engine to improve the combustion. The moisture in the form of steam is used to form a cushion effect to stop engine knocking and increase the power generated. In the Ricketts' patent a vacuum valve is disposed between a supply of water and the engine such that as suction is produced in the manifold the valve is closed. As the work of the engine increases so that less vacuum is produced, the valve is opened so that the water may be drawn into the manifold. Other U.S. patents such as U.S. Pat. No. 1,101,147 issued to Thomas F. Sawyer on June 23, 1914 and U.S. Pat. No. 819,239 issued to L. J. Marks on May 1, 1906 show examples of valves used in gasoline engine systems to introduce into the system mixtures of fluid to improve the operation of the engines. In none of these systems does the flow of additive vary directly with the load on the engine. Alternative known systems such as that disclosed in U.S. Pat. No. 4,119,062 issued to William T. Trevaskis on Oct. 10, 1978 introduces the antidetonant to the combustion chamber in a vapor rather than liquid form. Not only is this type system less efficient, but none are known to be totally responsive to engine demand. 1p It has further been known that the use of intake manifold pressure as a measure of critical need can be used as the controlling force for determining when antidetonant is to be added to the fuel/air stream. As pointed out in the April, 1949 (Volume 3, Number 2) issue of the Society of Automotive Engineers (SAE) Quarterly Transactions by C. H. Van Hartesveldt, the principle of using antidetonant only when needed has been known in both aircraft and automotive use. In that article an antidetonate injection unit is disclosed mounted on the carburetor of an automobile internal combustion engine system for discharge of the additive into the main venturi. While the article recognizes the importance of maximum delivery of the antidetonant at full throttle (maximum engine demand), the structure of the disclosed injection unit does not provide for an optimum increase of antidetonant as the engine reaches full demand. On the contrary, at full throttle the amount of antidetonant actually decreases as shown on FIG. 7 of that article.

None of the prior art systems disclose a simple mechanism that allows optimum control of the antidetonant directly related to engine demand. With the present day emphasis on anti-pollution control and engine economy resulting in overall decreases in stock engine performance and as a further result of the reduction of gasoline octane ratings, it is readily apparent that the availability of an improved antidetonant injection system is highly desirable.

SUMMARY OF THE INVENTION

An object of the present invention is to provide an improved fluid injection system for use in conjunction with an internal combustion engine system.

Another object of the present invention is to provide an improved valving configuration for use in a fluid injection system.

A further object of the present invention is to provide a unique antidetonant injection system for use in an automobile combustion engine wherein antidetonant is introduced during the combustion process in amounts directly responsive to engine load demand.

A still further object of this invention is to provide an antidetonant injection system having a novel valve that is responsive to performance characteristics of an internal combustion engine to control the amount of antidetonant being introduced into the combustion chamber of the engine during the combustion cycle.

Yet another object of this invention is to provide an antidetonant injection system that may be added to existing automobiles to improve the engine performance of the internal combustion engine during the combustion process. Still another object of this invention is to provide an antidetonant fluid injection system having a novel valving configuration responsive to performance characteristics of an internal combustion engine so as to control the amount of antidetonant and air mixture to the engine during the combustion cycle.

These and other objects of the invention are provided through the use of a fluid injection system having a novel valve and including an antidetonant fluid reservoir mounted on the chassis of the automobile. The valve is inserted in the existing vacuum connection between the PCV valve or its equivalent and the intake manifold of the carburetor with the valve inlet connected to the reservoir of antidetonant fluid. The valve housing is constructed so that the valve passage is opened in increasing amounts as engine demand is increased and a mixture of the antidetonant and air allowed to pass through the valve outlet into the intake manifold to be mixed with the mixture of fuel and air prior to entering the combustion chamber. The antidetonant is a proprietary mixture including lightly based hydrocarbons, surfactants and water that results in a decrease in the temperature of the intake charge and a decrease in the carbon by-products normally associated with the combustion process. The decreased intake manifold temperature further results in a combustion charge that has an increased density and greater potential for expansion. In addition, the conversion from liquid to vapor during the combustion process consumes heat at the rate of 600 calories per gram of liquid at a very critical instant allowing a slower than normal increase in combustion temperature to a lower than normal temperature peak. The main passage of the valve, designed to be closed when the engine is idling, allows varying controlled amounts of antidetonant to flow proportional to the amount of engine load demand or acceleration. The inclusion of a check valve ball positioned in a specially constructed chamber in the main passage having circular cross sections of varying diameters is responsible for the precise control of the flow of antidetonant related to engine demand. The walls of the generally tubular shaped chamber are designed to gradually diverge so that as the distance from the valve seat is increased, so does the diameter of each circle representing the chamber's cross section. This critical structural design feature of the chamber allows more area and hence more antidetonant and air to flow around the ball, through the main passage of the valve and into the intake side of the carburetor as the ball moves away from its valve seat. The structure of the valve, as will be explained in the description of the preferred embodiment, includes a biasing means to force the ball away from its valve seat a progressively greater distance as the demand on the engine increases.

Another critical structural design feature of the valve resides in the provision of an air inlet to the chamber separate and apart from the antidetonant fluid inlet into the chamber. Both the antidetonant and air are allowed to mix in the chamber in a desired ratio so that adequate oxygen is eventually fed into the combustion chamber of the engine. In an alternative embodiment, a second valve identically structured as the main valve is provided to permit the introduction of air to the antidetonant even when the check valve ball shuts off the air supply in the main valve.

Objects, advantages and novel features of the present invention will become apparent from the following detailed description of the invention when considered in conjunction with the accompanying drawings.

BRIEF DESCRIPTION OF THE DRAWINGS

FIG. 1 is a schematic drawing of the fluid injection system showing the valve connections;

FIG. 2A is a cross section of the valve housing;

FIG. 2B is a cross section of an alternative embodiment of one section of the valve housing;

FIG. 3 is a cross section taken along the same lines of FIG. 2 of the valve housing with its components in place; and FIG. 4 is a schematic drawing depicting an alternative embodiment of the fluid injection system using two valves.

DESCRIPTION OF THE PREFERRED EMBODIMENTS

The schematic of FIG. 1 illustrates a fluid injection system 10 as having a reservoir 12 within which antidetonant fluid 14 is stored, PCV valve 16, carburetor 18 and valve 20. Valve 20 is designed so that inlets 24, 25 and 28 are in fluid communication with outlet 32 as will be explained in greater detail below. Flexible tubing 22 has one end positioned in reservoir 12 and the other end connected to inlet 24 of valve 20. In the preferred embodiment a filter is provided at the end of tubing 22 located in the reservoir to prevent pollutants and solid particles from clogging the valve 20. Flexible tubing 26 has one end connected to PCV valve 16 and its other end to inlet 28 of valve 20. Flexible tubing 30 connects outlet 32 of valve 20 to the intake side of carburetor 18. PCV valve 16 and carburetor 18 represent standard components found in automobiles having an internal combustion engine system while reservoir 12 and valve 20 are anticipated to be supplied as add-ons. As will be explained below the PCV connection allows increased control of antidetonant flow. Reservoir 12 may be mounted by a suitable method at any convenient location on the chassis of an automobile in a position that is always lower with respect to the ground level than valve 20 so that no syphoning action from the reservoir can occur. In the preferred embodiment, reservoir 12 is mounted on the fire wall under the hood of the automobile.

As is well known to those in the art, the PCV valve is generally connected directly to the intake manifold of the carburetor and has as its primary purpose the venting, by suction developed in the intake manifold of unburned fuel and other pollutants back into the intake side of the carburetor for burning during the combustion process. Neither the function of the PCV valve nor the suction action developed in the intake manifold is effected by the insertion of valve 20 which is constructed to allow the continuous uninterrupted flow of the pollutants from PCV valve 16 through the passage from inlet 28 to outlet 32 of valve 20 into the intake side of carburetor 18. Thus, the use of valve 20 does not adversely affect the normal operation of the PCV valve 16 or carburetor 18.

When the engine is idling the suction developed in the intake manifold is the greatest and, as explained in detail below, the main passage of valve 20 between inlet 24 and outlet 32 is closed. As the engine load is increased, as happens during acceleration, the suction or negative pressure from the intake manifold is decreased and the main passage between inlet 24 and outlet 32 in valve 20 is designed to open so that a mixture of antidetonant 14 and air in the desired ratio is drawn into the intake side of carburetor 18. As is explained in greater detail below, the closure means in the main passage between inlet 24 and outlet 32 is structured so that as the acceleration or load of the car engine is increased and the suction in the intake manifold of the carburetor decreased the amount of antidetonant 14 and air flowing into the intake side of carburetor 18 is increased. The presence of antidetonant 14 in the intake side of carburetor 18 allows it to be mixed with the standard fuel and air mixture in the combustion chamber. As previously pointed out, the proprietary mixture of hydrocarbons, alcohols, surfactants and water in antidetonant fluid 14 accomplishes the cleansing of carbon deposits in the combustion chamber and intake valves as well as a lowering of the temperature of the intake charge in the combustion chamber. Thus, improved engine performance results.

FIG. 2A illustrates a cross section taken of the valve 20 without any of its components and is identified as valve housing 33. In the preferred embodiment the material used for valve housing 33 is an easily molded machinable polyester plastic having a melting point substantially higher than the 325° F. peak temperature anticipated under the hood of an automobile. It is obvious that any suitable material that is impervious to the corrosive effects of the chemicals in antidetonant 14 may be used. Inlet 28 is seen to be at one end of through bore 34 and outlet 32 is located at the other end thereof. In fluid communication with bore 34 is bore 36 formed in housing 33 and having a closed end section 36' and an open ended section 36". Section 36" includes valve seat 38, valve chamber 40 and outer end 42. Connected to valve chamber 40 is bore 44 having a fluid flow restrictor 46 located at the inner end thereof and inlet 24 located at the outer end thereof. In the preferred embodiment flow restricter 46 is formed with a small hole of 0.016-0.050 inch diameter. Valve chamber 40 has gradually increasing circular cross sections having a diameter of 0.375 at valve seat 38 and a diameter of 0.385 at location 52. The diameter of the circular cross section of section 36" of bore 36 from location 52 to the outer end 42 is constant for reasons to be explained below.

In an alternative embodiment of the housing 33, bore 34 may be positioned so that the closed end of section 36' of bore 36 is located on the interior wall of bore 34 as is illustrated in FIG. 2B.

The components that make up the operational valve are shown in position in FIG. 3. Tubular shaped sections 54 and 56 are located at inlet 28 and outlet 32 or bore 34, respectively so that the ends flexible tubing 26 and 30 may be slipped over the outer ends thereof in a fluid tight condition. It is obvious that sections 54 and 56 may be formed integrally with housing 33 if so desired. Stainless steel compression spring 58 is located in section 36' bore 36 as shown so that in a noncompressed position one end thereof is positioned in section 36" of bore 36 just past vavle seat 38 and into valve chamber 40. Stainless steel check valve ball 60 is housed in valve chamber 40 between O-rings 62 and 64 so that a fluid tight condition results when ball 60 is seated on either O-ring 62 or 64, respectively. Washer-like plug 66, having an air passage 68, is fit into outlet 42 and, in the preferred embodiment, is fabricated from any suitable material that is impervious to antidetonant fluid 14. Air filter 69 is provided in opening 42 and, in the preferred embodiment, may be either a sintered bronze or porous plastic. Pipe segment 70 is inserted or molded into inlet 24 of bore 44 so that the end of flexible tubing 22 may be slipped over the outer end thereof in a fluid tight condition.

In operation, when the engine system to which the antidetonant injection system has been added is in an idling condition, the vacuum or suction from the manifold of the carburetor is at its maximum value. This value is generally 15 to 20 inches of mercury where one inch of mercury equals approximately 0.5 pound per square inch negative pressure at sea level. The suction force of vacuum causes check valve ball 60 into O-ring 62 in a fluid tight relationship sealing the main passageway inlet 24 and outlet 32 of valve 20. It is to be noted that 15 to 20 inches of mercury is sufficiently less than that atmospheric pressure in valve chamber 40 to allow the operation of valve 20 as explained below. Spring 58 is positioned and calibrated to exert force against ball 60, but not enough force to unseat ball 60 from O-ring 62 when the engine is in an idling condition. Thus, no antidetonant flows into the intake side of the carburetor.

Upon the value of vacuum from the intake manifold decreasing as happens when the engine is accelerated, the compression force of spring 58 is sufficient to unseat ball 60 from O-ring 62 so that antidetonant 14 can flow from the valve chamber 40 through outlet 32. As the throttling action of the engine is increased, the vacuum from the intake manifold is decreased resulting in the spring 58 being able to push ball 60 towards plug 66 until the ball 60 is sealed against O-ring 64 in a fluid tight relationship. Due to the increasing diameter of the circular cross sections of valve chamber 40 from seat 38 to location 52 in valve chamber 40, as explained above, the amount of antidetonant 14 allowed to pass into the intake manifold is increased as ball 60 approaches plug 66 and O-ring 64. The suction from the intake manifold draws antidetonant 14 from reservoir 12 through tubing 22, tubing 70, flow restrictor 46, into valve chamber 40. At the same time air is drawn through passage 68 into valve chamber 40. The mixture of antidetonant 14 and air then passes through outlet 32 and into the intake manifold for distribution in the combustion chamber along with the standard fuel and air mixture.

Air passage 68 in plug 66 serves three purposes; first, to allow extra air into valve chamber 40 for the purpose of being mixed with antidetonant 14 as it is introduced into the intake side of carburator 18; second, to provide an additional force to push check valve ball 60 toward its closed position in engagement with O-ring 62 when the suction in the intake manifold increases and it is desired to immediately cut off the flow of antidetonant 14 into the carburetor 50 that any vacuum that may otherwise be trapped in valve chamber 40 is eliminated; and three, to control the amount of fluid being aspirated as ball 60 approaches O-ring 64 by allowing more antidetonant and less air to enter valve chamber 40.

In the rare instance in which a PCV valve is not used or when it is impractical to connect the existing PCV valve to the inventive system, inlet 28 of valve 20 may be capped. The operation of the system is affected in that some antidetonant 14 may be trapped in the fluid flow line between outlet 32 and the intake side of carburetor 18 and slowly dribble into the carburetor when it is not needed. Further, when valve 20 initially opens, the reaction time for the antidetonant to reach the carburetor is lengthened. Therefore, to counteract having no PCV valve connection, tubing length 30 should be made as short as possible and connected to the intake side of the carburetor in the same location or in close proximity to where the PCV valve would ordinarily be connected.

In the preferred embodiment the following values and dimensions have been found to be desirable:

1. check valve ball 60 diameter of 0.375 inch ±0.0005.
2. compression spring 58 spring rate of 1.266 pounds per inch so that at 3½" vacuum the ball will be unseated from O-ring 62.
3. compression spring 58 compressed 0.110 inch maximum.
4. O-ring 62 and 64 inner diameter of 0.25 inch.
5. maximum antidetonant fluid and air flow at an intake manifold vacuum of 1" vacuum.
6. an increase in diameter of the circular cross section of valve chamber 40 from 0.377 inch at valve seat 38 to 0.385 inch at location 52.
7. plug 66 diameter of 0.675 inch.
8. air passage 68 diameter of 0.090 inch
9. distance from valve seat 38 to plug 66 of 0.375 to 0.075 inch.

Using the above values, test use of the antidetonant injection system 10 has shown that approximately one quart of antidetonant 14 is consumed per 3,000 miles of average travel distance.

FIG. 4 represents a schematic diagram of an alternative embodiment of the invention wherein a valve 20', identical in structure to valve 20 is used to insure that a proper amount of air is mixed with antidetonant 14 before entering into the intake side of carburetor 18. Inlet 28' of valve 20' is connected to the PCV valve 16 via T-shaped connector 80, such that the operation of valve 20 is not affected. Outlet 32' of valve 20' is connected to the intake side of carburetor 18 via T-shaped connector 82 without affecting the operation of valve 20. Inlet 24' of valve 20' is not connected to antidetonant 14 so that air may enter tubing 30 through valve 20' into carburetor 18 whenever antidetonant 14 is drawn through valve 20.

The significance of the addition of valve 20' is apparent when check valve ball 60 of valve 20 is seated in a fluid tight condition against O-ring 64, so that air cannot enter valve chamber 40 via air passage 68. Without valve 20' connected as described above, more antidetonant 14 than necessary may enter carburetor 18 resulting in a waste of antidetonant 14. It is important to note that in all other respects, the preferred embodiment of the antidetonant injection system using a single valve 20 is as efficient as the embodiment using valve 20'.

From the preceeding description of the preferred embodiments, it is evident that the objects of the invention are attained and that an antidetonant injection system having a novel valve that can be used in any internal combustion engine system is provided which will result in more efficient engine performance.

Although the invention has been described and illustrated in detail, it is to be clearly understood that the same is by way of illustration and example only and is not to be taken by way of limitation. The spirit and scope of this invention are to be limited by the terms of the appended claims.

What is claimed is:

1. A valve comprising:
   an outlet passage being adapted to be connected to a source of vacuum in an intake manifold of said engine;
   a first inlet passage adapted to be connected to a supply of antidetonant fluid;
   a second inlet passage having an air filter for the purpose of allowing the entry of filtered air therein;
   a third inlet passage adapted to be connected to a PCV valve;
   a fluid mixing chamber into which antidetonant fluid and filter air flows;
   a moveable fluid mixing control means located in said fluid mixing chamber;
   a biasing means operatively associated with said fluid mixing control means for moving said fluid mixing control means at predetermined vacuum conditions;
   said moveable fluid mixing control means having a first position in said fluid mixing chamber wherein no antidetonant fluid nor filtered air can flow through said outlet passage;
   said moveable fluid mixing control means having a plurality of positions other than said first position wherein a mixture of antidetonant fluid and filtered air is allowed to pass through said outlet passage, said mixture having different ratios of antidetonant fluid to filtered air;
   and said third inlet passage being in continuous fluid communication with said outlet passage.

2. The device of claim 1 wherein said moveable fluid mixing control means is a ball shaped member.

3. The device of claim 2 wherein said biasing means is a spring.

4. The device of claim 3 wherein a valve seat is provided upon which said ball sits when in said first position.

5. The device of claim 4 wherein said first and second inlet passages are located on one side of said valve seat and said third inlet passage and said outlet passage are located on the other side of said valve seat.

6. The device of claim 5 wherein said spring provides a force acting to push said ball off of said valve seat in opposition to forces on said ball.

* * * * *